United States Patent [19]

Polka

[11] Patent Number: 5,061,014
[45] Date of Patent: Oct. 29, 1991

[54] AXLE CAP FOR TRUCK WHEELS HAVING FOUR, FIVE OR SIX LOCATORS

[76] Inventor: John G. Polka, 1355 Margate, Libertyville, Ill. 60048

[21] Appl. No.: 625,431

[22] Filed: Dec. 11, 1990

[51] Int. Cl.⁵ .............................................. B60B 7/06
[52] U.S. Cl. ............................ 301/108 R; 301/37 TP
[58] Field of Search .................. 301/37 R, 37 P, 37 S, 301/37 TP, 108 R, 108 S, 108 A, 105 R

[56] References Cited

U.S. PATENT DOCUMENTS

| | | | |
|---|---|---|---|
| 2,098,205 | 11/1937 | Eksergian | 301/108 R |
| 2,268,132 | 12/1941 | Candellero | 301/108 R |
| 4,811,992 | 3/1989 | Steiner | 301/105 R |

FOREIGN PATENT DOCUMENTS

| | | | |
|---|---|---|---|
| 554425 | 3/1958 | Canada | 301/37 TP |
| 0310777 | 4/1989 | European Pat. Off. | 301/108 R |

Primary Examiner—Russell D. Stormer
Attorney, Agent, or Firm—Edmond T. Patnaude

[57] ABSTRACT

Certain truck wheels have stud-like locators to accurately position a wheel on the hub. Such hubs may have four, five or six of such locators. A cap is adapted to cover the hub of such wheels, including the locators, and fit hubs having all three configurations of locators.

10 Claims, 3 Drawing Sheets

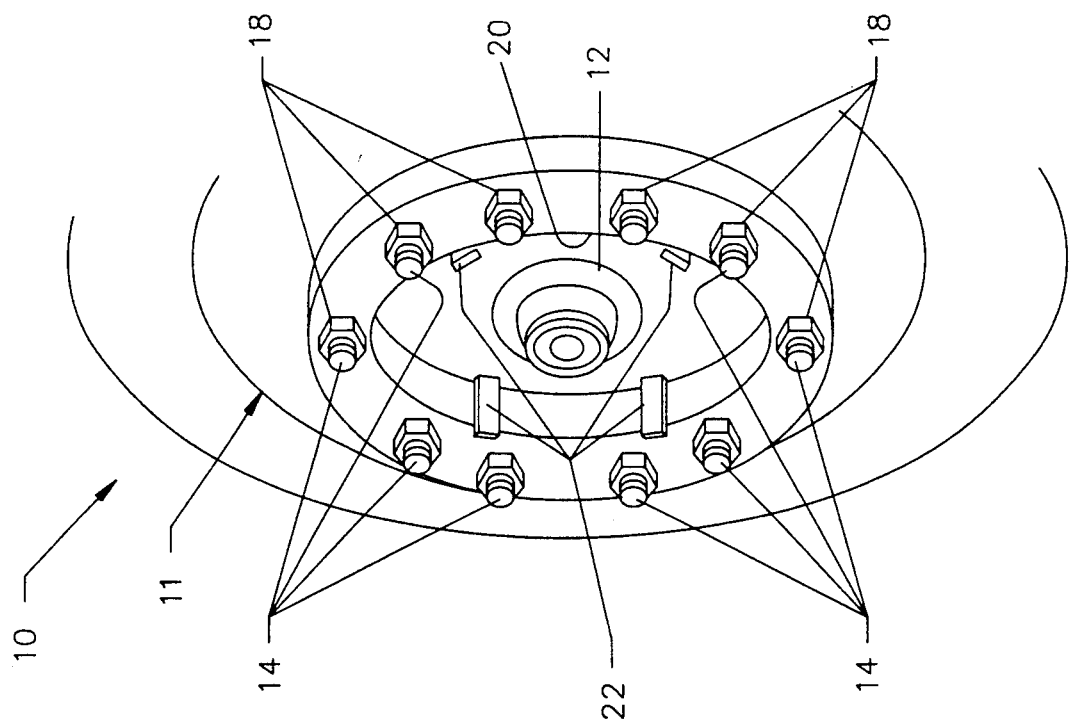
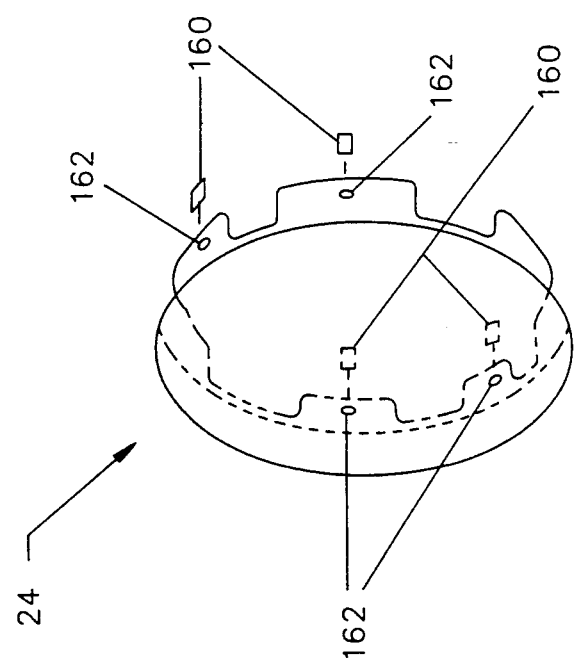
FIG.1

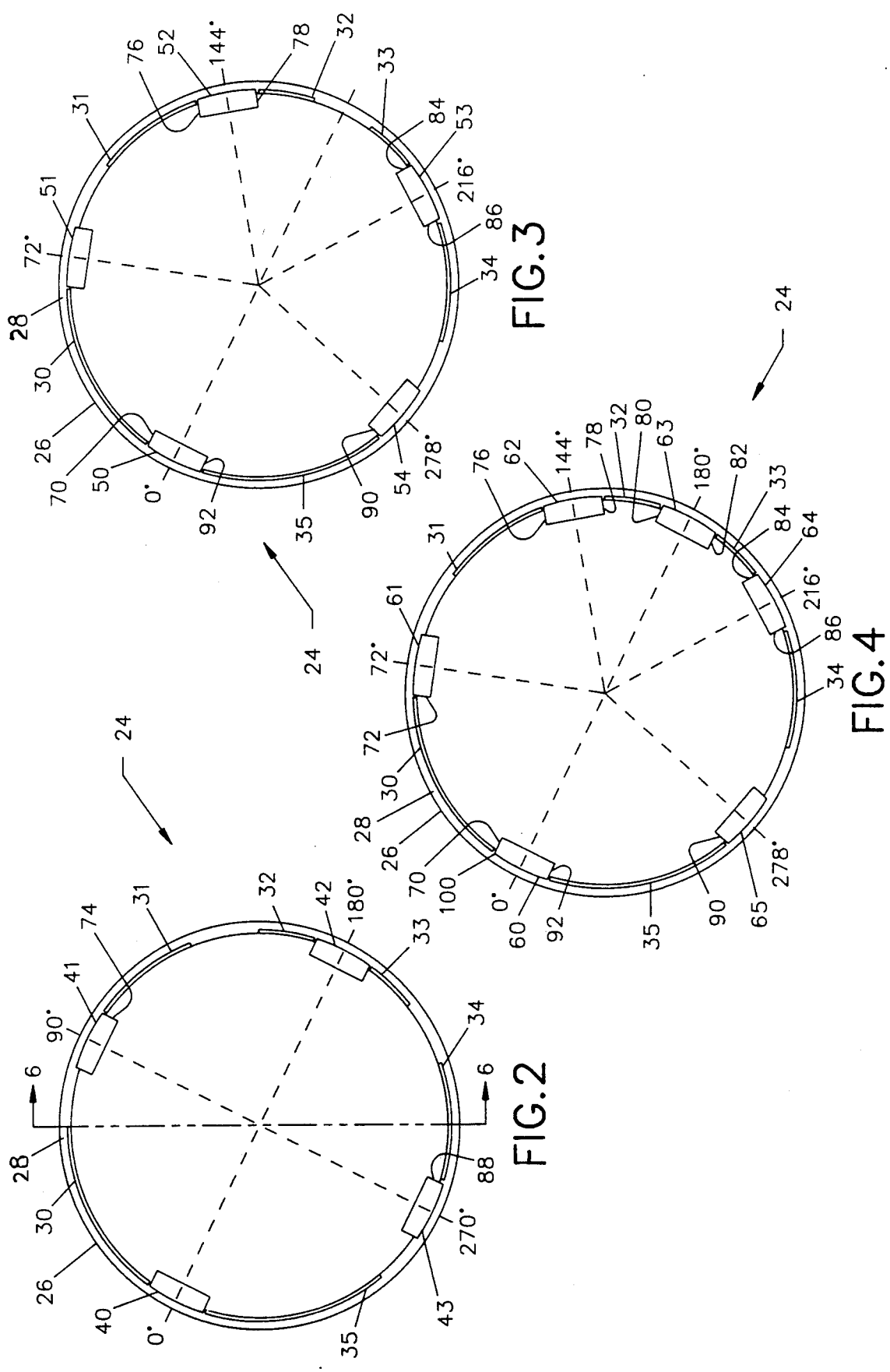

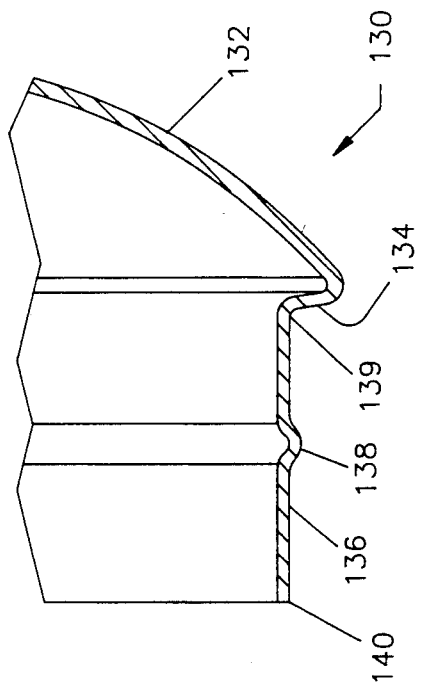
FIG. 7
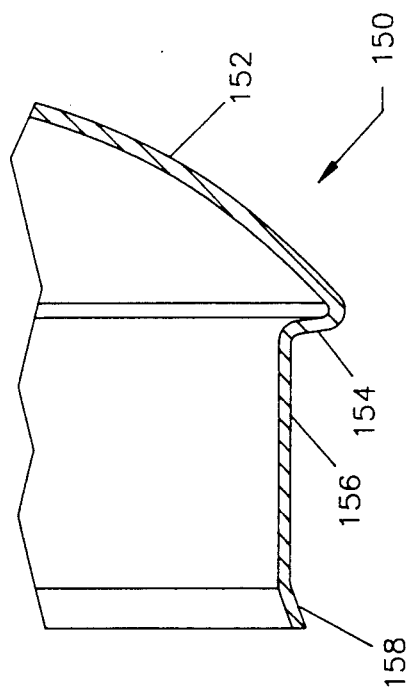
FIG. 8
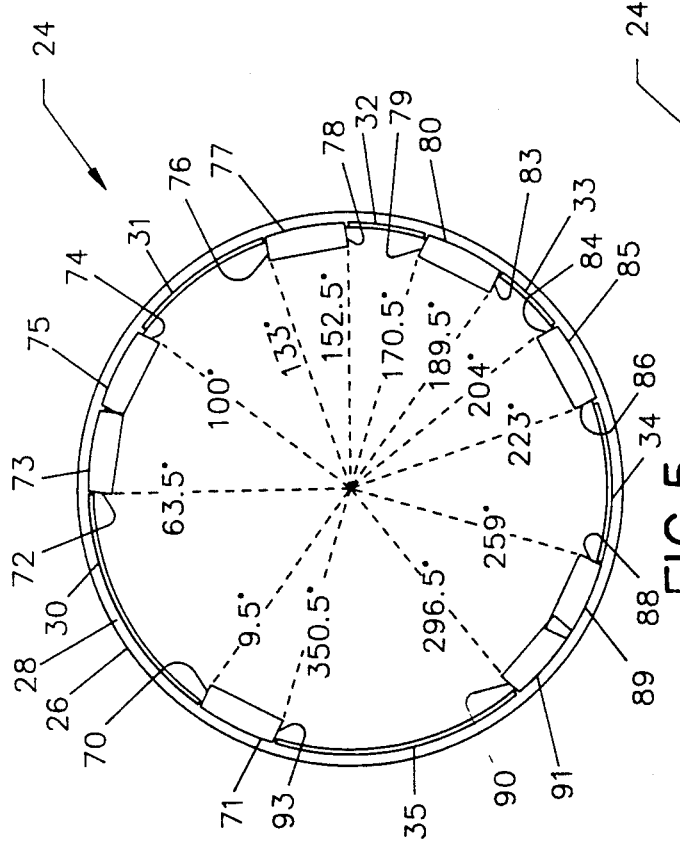
FIG. 5
FIG. 6

AXLE CAP FOR TRUCK WHEELS HAVING FOUR, FIVE OR SIX LOCATORS

The present invention relates to a decorative axle cap to cover the end of the axles of the wheels of trucks, and specifically to a cap which is adapted to fit on truck axles which provide for four, five or six locators to position a wheel thereon.

BACKGROUND OF THE INVENTION

To precisely locate a wheel on the hub of certain trucks, locators are provided on the hub which are outwardly projecting studs in parallel relationship with each other and with the axis of the wheel, spaced around the hub and positioned so as to project inside the central opening of a wheel. The hubs may have four, five or six of such locators to accurately position a wheel thereon. The hub assembly of wheels, including the projection of the axle and the locators, tends to collect dirt and oil and generally present an unsightly exterior appearance.

To enhance the exterior appearance of the wheels of trucks, a cap is provided which fits within the central opening of the wheel and covers the portion of the hub visible through the central opening of the wheel, including the locators and the axle. The cap must fit tightly against the hub of the wheel and move in union with the wheel as it rotates and crosses rough terrain so as not to rattle or vibrate and thus cause undesired noises.

The cap is generally concavo-convex in shape with a circular perimeter, and has arcuate flanges spaced around the circular perimeter which project away from the concave side of the cap. The arcuate flanges fit tightly within the central opening of the wheel and extend between the locators to rigidly retain the cap over the hub of the wheel. To maintain the necessary rigidity of the cap on the wheel, it is desirable to maximize the angular lengths of the flanges, and provide rigidity to the flanges.

Existing caps which are designed to fit a four locator hub have four arcuate flanges; caps designed to fit a five locator hub have five arcuate flanges; and caps designed to fit a six locator hub have six arcuate flanges. In each case the flanges are adapted to project inside the circular central opening of a wheel and extend around the inside circumference between the locators on the hub.

Suppliers of caps have been required to maintain expensive inventories and allocate storage space for caps which are substantially the same in appearance, but accommodate each of the three different configurations of locators. Furthermore, truck owners seeking to purchase caps have frequently found themselves confused and frustrated by not knowing the number of locators on their hubs, and therefor risk purchasing unusable caps. It is, therefore, desirable to provide a single cap which would fit securely on hubs having any of the three configurations of locators, and thereby reduce confusion, costs, and storage space, all of which arise from the requirement that separate caps be available for each configuration of hubs.

BRIEF DESCRIPTION OF THE INVENTION

The present invention is embodied in a cap for covering the central opening of a truck wheel which is mounted on the hub of a truck, where the hub has four, five or six stud-like locators. The cap has a body portion adapted to cover the portions of the locators projecting through the central opening of the wheel. Spaced around the circumference of the body portion, the cap has arcuate flanges which form segments of a hollow cylinder and which project away from the one side of the body portion.

The present invention provides for six flanges with lengths and positions chosen such that flanges of the cap will fit between locators on the hub of a wheel, whether the hub has four, five, or six locators.

BRIEF DESCRIPTION OF THE DRAWINGS

The present invention will be better understood by a reading of the following detailed description taken in connection with the accompanying drawings wherein:

FIG. 1 is an exploded isometric view of a cap in accordance with the present invention positioned for attachment to the hub of a wheel having four locators;

FIG. 2 is an inside view of the concave side of the cap in FIG. 1 showing the location of the flanges when the cap is positioned on a hub having four locators;

FIG. 3 is an inside view of the concave side of the cap in FIG. 1 showing the location of the flanges when the cap is positioned on a hub having five locators;

FIG. 4 is an inside view of the concave side of the cap in FIG. 1 showing the location of the flanges when the cap is positioned on a hub having six locators;

FIG. 5 is an inside view of the concave side of the cap in FIG. 1 showing the location of the flanges when the locators of hubs having 4, 5, and 6 locators are superimposed over one another;

FIG. 6 is a cross-sectional view of a cap in FIG. 2 taken through line 6—6, showing a stiffener for the flanges;

FIG. 7 is a fragmentary cross-sectional view of a cap in accordance with the present invention showing a second embodiment of a stiffener for the flanges; and FIG. 8 is a fragmentary cross-sectional view of a cap in accordance with the present invention showing a third embodiment of a stiffener for the flanges.

DETAILED DESCRIPTION OF THE INVENTION

Referring to FIGS. 1, 2, and 6, a typical truck wheel assembly 10, consists of a wheel 11, mounted on a hub 12, and held in place by a plurality of spaced studs 14. The studs 14 are integral with the hub 12, and project through a plurality of openings, not shown, in the wheel 11, the location of which corresponds to the locations of studs 14. At the end of each of the studs 14 are lug nuts 18, one lug nut being secured to each of the studs 14. Wheel 11 has a central opening 20 which fits over a plurality of substantially rectangular stud-like locators 22, spaced around the hub 12, in parallel relationship with the studs 14. The locators 22, are intrugral with the hub 12 and are positioned so as to accurately center the central opening 20 of the wheel 11 on the hub 12. The central opening 20 typically has a diameter of $8\frac{7}{8}$ inches.

Trucks may have hubs which provide for four, five or six locators to position the wheel on the hub as shown in FIGS. 2, 3, and 4 respectively. Locators on the hubs of all these configurations have a length of two inches projecting from the hub, and a cross sectional length of $1\frac{1}{4}$ inches along the inner cord of central opening 20, and a width of $\frac{1}{4}$ inches. To cover the hub and locators, a cap 24 in accordance with the present invention is provided.

Cap 24 has a body section 26 which in the preferred embodiment is concavo-convex in shape and around the inner circumference of the concave side thereof is an annular ridge 28. Spaced around the inner edge of annular ridge 28 are arcuate flanges 30, 31, 32, 33, 34, and 35 as shown in FIGS. 2, 3, 4 and 5. Flanges 30, 31, 32, 33, 34, and 35 form segments of a hollow cylinder and project away from the one side of the body section 26, and are positioned so as to tightly fit within the central opening 20 of the wheel 11, and therefore, none of the flanges 30, 31, 32, 33, 34, 35 can be any longer than the distance between the locators within which the flange is intended to fit.

The positions of the flanges of a cap in accordance with the present invention and the relationship of the flanges to a hub having four, five or six locators can be seen in FIGS. 2, 3 and 4 respectively. Referring to FIG. 2, the locators of a hub having four locators 40, 41, 42 and 43 are positioned such that the centers of the locators are 90° apart from one another. Flange 31 extends around an arc commencing with the trailing edge 74 of a third locator 75 positioned with a center 90° apart from the center of the common locator 71 and extending to the leading edge 76 of a fourth locator 77 positioned with a center 144° apart from the center of the common locator 71. Flange 32 extends around an arc commencing with the trailing edge 78 of the fourth locator 77 and extending to the leading edge 79 of a fifth locator 80 with a center 180° apart from the center of the common locator 71. Flange 33 extends around an arc commencing with the trailing edge 87 of the fifth locator 80 and extending to the leading edge 84 of a sixth locator 85 having a center 216° apart from the center of the common locator 71. Flange 34 extends around an arc commencing with the trailing edge 86 of sixth locator 85 and extending to the leading edge 88 of a seventh locator 89 having a center 270° apart from the center of the common locator. Flanges 35 extends around an arc commencing from the trailing edge 90 of an eighth locator 91 positioned with a center 278° apart from the center of the common locator 71 and extending to the leading edge 93 of the common locator 71.

In the preferred embodiment the flanges are positioned around the circumference of the body portion with angular positions relative to the center of the common locator 71 as follows, flange 30 extends from about 9.5° to about 63.5°
flange 31 extends from about 100° to about 133°
flange 32 extends from about 152.5° to about 170.5°
flange 33 extends from about 189.5° to about 204°
flange 34 extends from about 223° to about 259° and
flange 35 extends from about 296.5° to about 350.5°

In this instance, flange 30 of the cap 24 will fit between locators 40 and 41, flanges 31 and 32 will fit between locators 41 and 42, flanges 33 and 34 will fit between locators 42 and 43, and flange 35 will fit between locators 43 and 40. Referring to FIG. 3, the locators of a hub having five locators 50, 51, 52, 53 and 54 are positioned such that the center of the locators are 72° apart from one another. In this instance flange 30 will fit between locators 50 and 51, flange 31 will fit between locators 51 and 52, flanges 32 and 33 will fit between locators 52 and 53, flange 34 will fit between locators 53 and 54, and flange 35 will fit between locators 54 and 50. Referring to FIG. 4, the locators of a hub having six locators 60, 61, 62, 63, 64 and 65 are positioned such that the center of the locators are 72° apart from one another as is the case with a five locator hub except that a sixth locator 63 is positioned midway between two of the otherwise equally spaced locators, 62 and 64, such that the center of locator 63 is therefore 36° apart from each of the adjacent locators 62, 64. In this instance flange 30 fits between locators 60 and 61, flange 31 fits between locators 61 and 62, flange 32 fits between locators 62 and 63, flange 33 fits between locators 63 and 64, flange 34 fits between locators 64 and 65 and flange 35 fits between locators 65 and 60.

Referring to FIG. 5 and following a circular path clockwise around the cap 24, beginning with flange 30, flange 30 extends around an arc commencing from the trailing edge 70 of the first locator 71 which is common to all three hubs and bears numbers 40, 50 and 60 as shown in FIGS. 2, 3 and 4 respectively, and extending to the leading edge 72 of a second locator 73 positioned with a center 72° apart from the center of the common locator 71.

An important feature of the present invention is to compensate for the reduction in flange lengths relative to prior caps by increasing the rigidity of the flanges. To increase the rigidity of the flanges a plurality of spaced wedge shape dimples 118 are stamped into the metal of the flanges, deforming the flanges at the intersection of the flanges and the annular ridge 28 as shown in FIG. 6.

A second embodiment of a stiffiner is shown in FIG. 7 in which a cap 130 has a body portion 132 and around the inward circumference of the concave side thereof is an annular ridge 134. Projecting outwardly from the concave side of body section 132 is flange 136. To increase the rigidity of flange 136 a longitudinal bead 138 is pressed into the flange 136, the bead following the arc of the flange 136 parallel to the inner edge 139 and the outer edge 140 and extending the length of the flange 136.

A third embodiment of a stiffener is shown in FIG. 8 in which a cap 150 has a body portion 152, and around the inward circumference of the concave side thereof is an annular ridge 154. Projecting outwardly from the concave side of body portion 152 is a flange 156. Again, to increase the rigidity of flange 156 a flair 158 is provided along the length of the free end of flange 156.

In all of the foregoing embodiments, as shown in FIG. 1, there are within the flanges a plurality of spaced clips 160 having an outwardly projecting spring-like finger which presses against the inside of the central opening 20 of the wheel 11. The clips 160 snap into holes 162 in flanges 30, 32, 34 and 35 to further retain the cap 24 within the inner opening 20 of wheel 11.

While the present invention has been described in connection with three embodiments it will be apparent to those skilled in the art that many changes and modifications may be made without departing from the true spirit and scope of the present invention. Therefore it is the intent of the appending claims to cover all such changes and modifications which come within the true spirit and scope of the invention.

What is claimed:

1. A cap for covering the central opening of a truck wheel while the wheel is mounted on the hub of a truck, the hub having four, five or six locators spaced around the hub, the locators projecting outwardly in parallel relationship with each other so as to project through the central opening of the wheel to position the wheel on the hub, said cap comprising in combination:

a body portion adapted to cover said locators and the hub of said wheel and having a circular outer perimeter, a plurality of arcuate flanges spaced around the circumference of said body portion, said flanges forming segments of a hollow cylinder and projecting away from one side of said body, said flanges having arcuate lengths and positions around the circumference of said body portion such that said flanges will fit between the locators of hubs having four, five and six locators.

2. A cap in accordance with claim 1 wherein said flanges have a stiffener along the length of said flanges.

3. A cap in accordance with claim 2 wherein said stiffener comprise a plurality of dimples along the length of said flanges.

4. A cap in accordance with claim 2 wherein said stiffener comprises a longitudinal bead along the length of each of said flanges.

5. A cap in accordance with claim 2 wherein said stiffener comprises a flair along the free end of said of said flanges.

6. A cap as set forth in claim 1 wherein said flanges having locations and lengths determined by commencing at a point on said circular perimeter and extending around the circumference of said body portion as follows;

a first flange extending a portion of the arcuate distance from 9.5° to 63.5°;

a second flange separated from said first flange by a space, said second flange extending a portion of the arcuate distance from 100° to 133°;

a third flange separated from said second flange by a space, said third flange extending a portion of the arcuate distance from 152.5° to 170.5°;

a fourth flange separated from said third flange by a space, said fourth flange extending a portion of the arcuate distance from 189.5° to 204°;

a fifth flange separated from said fourth flange by a space, said fifth flange extending a portion of the arcuate distance from 223° to 259°; and a sixth flange separated from said fifth flange by a space, said sixth flange extending a portion of the arcuate distance from 296.5° to 350.5°.

7. A cap in accordance with claim 6 wherein said flanges have a stiffener along the length of said flanges.

8. A cap in accordance with claim 7 wherein said stiffener comprise a plurality of dimples along the length of said flanges.

9. A cap in accordance with claim 7 wherein said stiffener comprises a longitudinal bead along the length of each of said flanges.

10. A cap in accordance with claim 7 wherein said stiffener comprises a flair along the free end of each of said flanges.

* * * * *

UNITED STATES PATENT AND TRADEMARK OFFICE
CERTIFICATE OF CORRECTION

PATENT NO. : 5,061,014
DATED : October 29, 1991
INVENTOR(S) : John G. Polka

It is certified that error appears in the above-identified patent and that said Letters Patent is hereby corrected as shown below:

Column 3, line 18, delete beginning with the words "Flange 31 extends..." the succeeding subject matter to and including all of line 50.

Column 4, after line 16, and prior to line 17, add the subject matter deleted from Column 3 above, that is add the words "Flange 31 extends..." followed by the total content of lines 19 to 50, both inclusive from Column 3.

Signed and Sealed this

Sixteenth Day of March, 1993

Attest:

STEPHEN G. KUNIN

Attesting Officer

Acting Commissioner of Patents and Trademarks